United States Patent [19]

Muller

[11] Patent Number: 5,030,350

[45] Date of Patent: Jul. 9, 1991

[54] FILTER MEDIUM FOR CAKE-FORMING FILTRATION PROCESSES

[75] Inventor: Hans-Rudolf Muller, Zurich, Switzerland

[73] Assignee: Zuricher Beuteltuchfabrik Aktiengesellschraft, Switzerland

[21] Appl. No.: 399,118

[22] Filed: Aug. 25, 1989

[30] Foreign Application Priority Data

Aug. 26, 1988 [DE] Fed. Rep. of Germany ....... 3829010

[51] Int. Cl.$^5$ .............................................. B01D 69/10
[52] U.S. Cl. ...................................... 210/490; 210/507
[58] Field of Search ........... 210/490, 491, 507, 321.75, 210/321.84; 204/296

[56] References Cited

U.S. PATENT DOCUMENTS

| | | | |
|---|---|---|---|
| 3,850,203 | 11/1974 | Shobert | 210/490 X |
| 4,066,553 | 1/1978 | Bardonnet et al. | 210/490 X |
| 4,214,994 | 7/1980 | Kitano et al. | 210/490 |
| 4,444,638 | 4/1984 | Maloney | 204/296 X |

Primary Examiner—Frank Spear
Attorney, Agent, or Firm—Mason, Fenwick & Lawrence

[57] ABSTRACT

A filter medium for cake-forming filtration processes is described, which is characterized in that a filter membrane is embedded on either side in a fabric structure, which assumes a mechanical protective function.

15 Claims, 1 Drawing Sheet

FILTER MEDIUM FOR CAKE-FORMING FILTRATION PROCESSES

BACKGROUND OF THE INVENTION

The present invention relates to a filter medium for cake-forming filtration processes.

In general, woven or needle-felted filter media are known, which are used for cake-forming filtration. Many varied requirements are made on such filter media. In particular, they must have openings such that those particles which are to be filtered out of the suspension are held back by the filter medium. A cake is then formed from these particles on the filter medium, while the liquid passes through the openings therein.

Modern process engineering makes it necessary to frequently filter extremely small particles out of a suspension. The hitherto known filter media, e.g., woven or needle-felted filter media, are difficult to produce with openings smaller than 10 um and this is certainly not possible when the openings are below 1 um. It is fundamentally possible to use filter membranes for such purposes. However, these membranes cannot meet the robust mechanical demands made in filtration technology. The filter medium is exposed to severe mechanical stresses, particularly during the removal or release of the filter cake. Filter membranes are unable to withstand these stresses to the desired extent.

The problem of the prior art is to provide a filter medium of the aforementioned type which, in the case of a particularly robust construction, is suitable for the filtration of suspensions containing extremely fine particles.

SUMMARY OF THE INVENTION

According to the present invention, this problem is solved in that a filtration membrane is embedded in at least one fabric structure serving as a support and protective structure. By means of a thus-constructed filter medium, it is possible to achieve the surprising advantage that, also in the case of filtration plants where the filter medium undergoes severe mechanical stressing, it is possible to process suspensions containing particles in the submicroporous range.

According to a particularly preferred embodiment of the present invention, the filter membrane comprises a submicroporous material. In this embodiment of the present invention, the filter medium can be manufactured particularly easily.

Preferably, the filter membrane has openings which are smaller than 10 um. The openings in the filter medium are smaller than 1 um. In such a construction of the inventive filter medium, the advantageous possibility is provided of processing suspensions in which conventional filtering means have proved unsatisfactory.

In an another embodiment of the present invention, the openings in the filter membrane are formed in the fabric construction following the penetration of a compact membrane material. The possibility exists of bringing about a particularly good adaptation to the particular requirements of the number and size of the openings in the filter membrane.

Another embodiment of the present invention provides that the membrane material of the filter membrane is embedded in a fabric, whose construction is such that one fabric side is compact and closely woven, whereas the other side is loose, and that the membrane mass is embedded in the looser fabric side. Preferably, the arrangement is such that the top fabric threads project on the looser fabric side over the membrane material. In this embodiment, the membrane material is brought into a three-dimensional fabric structure. The compact fabric side assumes the support function, while the looser fabric side protects the relatively sensitive membrane against mechanical stresses, damage and/or destruction. In particular, the top threads on the looser fabric side protect the membrane surface against abrasion.

In another embodiment of the present invention, the membrane material is placed between two fabric layers. The arrangement is preferably such that the membrane material is applied to a compact, strong support fabric layer and a protective fabric layer is inserted in the upper membrane material coating. Advantageously, the protective fabric layer is constructed as an open-mesh fabric. In such a construction, which can also be referred to as a sandwich structure, not only are many different design possibilities provided for the inventive filter material, but a filter medium constructed in this fashion, is especially robust in connection with the most varied uses and the requirements resulting therefrom.

BRIEF DESCRIPTION OF THE DRAWINGS

The present invention is described in greater detail hereinafter relative to a non-limitative embodiment and the attached drawings, wherein describe.

DETAILED DESCRIPTION OF THE PREFERRED EMBODIMENTS

Figure 1:
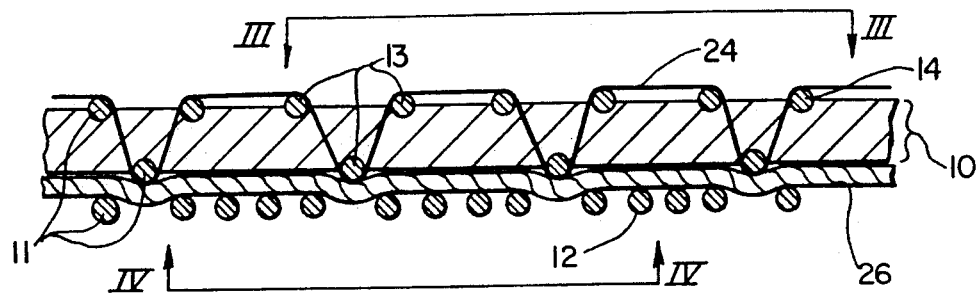
FIG. 1 is a sectional view of the filter medium in which a membrane coating is arranged in a three-dimensional fabric.

In describing the preferred embodiments of the subject invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

FIG. 1 shows in a section through a filter medium, a membrane material shaped to form a filter membrane 10, and which is embedded in a three-dimensional fabric structure 11. The compact fabric side represented on the bottom serves as the support fabric 12 for the filter membrane 10. The looser fabric side which is located on the top receives the filter material for the filter membrane 10. In addition, it also serves as a protective fabric 13 for filter membrane 10. The top fabric threads 14 of fabric structure 11 project out of the filter membrane 10 and, in this way, protect the sensitive membrane 10 against mechanical stresses (i.e., against abrasion).

Figure 2:
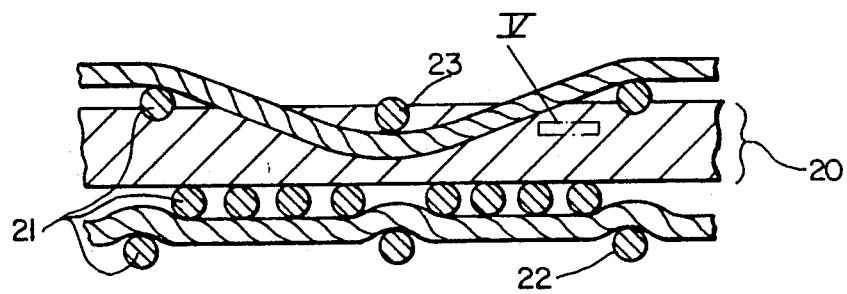
FIG. 2 is another sectional view of the filter medium in which a membrane coating is anchored between two fabric layers.

FIG. 2 illustrates a section of a filter membrane 20 that is placed between a support fabric 22 and a protective fabric 23. As in a sandwich structure, in this embodiment, the filter membrane 20 is arranged in a fabric structure 21 so that on either side of the sensitive filter membrane 20 there is provided a fabric protecting the filter membrane against mechanical damage, stressing and/or destruction.

The filter membrane 20 is enclosed between two fabric layers, namely between support fabric 22 and protective fabric 23. The top fabric layer, namely the protective fabric 23 is introduced in the membrane material forming the filter membrane 20. An open-mesh fabric is particularly suitable as a surface protection for filter membrane 20. The latter is firmly connected to both the support fabric 22 and to the protective fabric 23 and the latter can be firmly anchored in the membrane material to provide a very intimate connection.

The membrane materials forming the filter membrane 10 or 20 can comprise microporous or submicroporous materials, or it is possible to give the desired porosity to compact dense materials by physical and/or chemical treatments, after producing the connection between the filter membrane and the fabric structure.

When particularly high demands are made, it is possible to use more than one filter membrane layer, provided that in each case on either side thereof at least some fabric threads of the fabric structure project over the filter membrane in order to offer mechanical protection.

Figure 3:
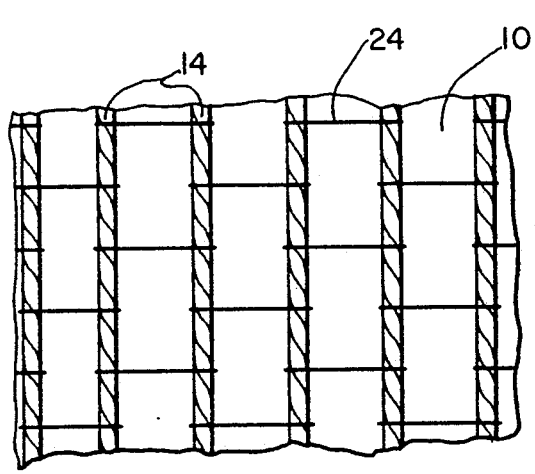
FIG. 3 is a top plan view of the fabric of FIG. 1 viewed along lines III—III.

FIG. 3 shows a top plan view of FIG. 1. Herein, the filter medium side adjacent to the medium to be filtered is illustrated. The top fabric threads 14 project above the filter membrane 10, whereby the top fabric threads 14 are connected with fabric threads 13 located under the filter membrane 10 by means of thin threads 24. Therefore, the filter membrane 10 is well protected and only a small part of the surface of the filter membrane 10 is covered by fabric threads 14 and 24.

Figure 4:
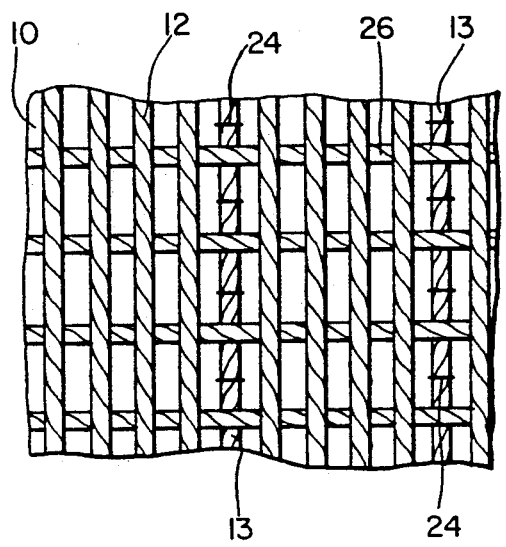
FIG. 4 is a bottom plan view of the fabric of FIG. 1 viewed along lines IV—IV.

FIG. 4 illustrates the filter medium side adjacent to the filtrate corresponding to projection IV of FIG. 1. The filter membrane 10 is supported by the support fabric 12 and a support fabric 26 extending transversely to the support fabric 12. Bottom threads of the protective fabric 13 are located between the support fabric 12 and 24 and the filter membrane 10, the bottom threads of the protective fabric 13 are connected to the top fabric threads 14 on the other side of the filter membrane 10 by means of the thin threads 24.

Figure 5:
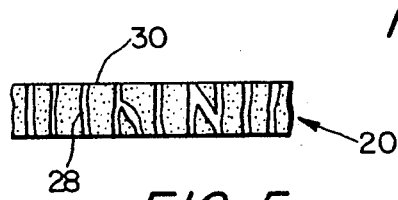
FIG. 5 is a fragmentary view of the membrane of FIG. 2.

FIG. 5 shows the details of a portion of the membrane of FIG. 2 in an enlarged scale but not true to scale. The filter membrane 20 consists of a microporous material. The filter membrane 20 has pores 28 with openings 30 which may have a diameter of less than 10 um (in special cases even less than 1 um). With this filter medium, it is possible to filter very fine particles from a medium to be filtered.

The microporous or submicroporous membrane material of the filter membrane is made of fibrous or felt-like tissues or of foam plastics. For example, thin tissues, membranes or plastic foils may be used as membrane material.

Hereinafter, two alternative methods of building up filter mediums are described.

The sandwich-type filter medium comprises filter members 10 and 20 built up by a foam plastic material. This material is located between an upper and lower fabric construction which is sewn therewith by means of big industrial sewing machines. This allows the filter medium to obtain a good mechanical stability.

In addition, it is possible to build up a filter medium by the following processing steps: Upper and lower fabric layer are connected with each other by means of small threads which have a defined uniform length. A porous membrane material is injected between these two fabric layers so that both layers are pressed apart from each other like the upper and lower side of an air mattress, whereafter both fabric layers have a constant distance from each other because of the definite length of the threads connecting both layers. Membrane material projecting over the outside of the fabric layers is cut away. By this methods, a sandwich-type filter medium is obtained, whereby the fabric layers are connected in the membrane material.

From the above, it is apparent that many modifications and variations of the present invention are possible in light of the above teachings. It is therefore to be understood that, within the scope of the appended claims, the invention may be practiced otherwise than as specifically described.

What is claimed is:

1. A filter medium for cake-forming filtration processes, the filter medium comprising:
   a filter membrane having surfaces; and
   at least one fabric structure for supporting and protecting the filter membrane;
   wherein the filter membrane is completely embedded in the at least one fabric structure so that the fabric structure projects from the surfaces of the membrane to thereby support and protect the membrane.

2. The filter medium according to claim 1, wherein said filter membrane comprises a submicroporous material.

3. The filter medium according to claim 1, wherein said filter membrane has openings smaller than 10 um.

4. The filter medium according to claim 1, wherein said filter membrane has openings smaller than 1 um.

5. The filter medium according to claim 3, wherein the openings in the filter membrane are formed following the penetration of a compact membrane material into the fabric structure.

6. The filter medium according to claim 1, wherein said fabric structure means comprising a fabric having first and second sides, said first fabric side being closely woven, and said second fabric side being loosely woven, said membrane material being embedded in said loose fabric side.

7. The filter medium according to claim 6, wherein said fabric has top fabric threads, and said top fabric threads project over said membrane material on said loose fabric side.

8. The filter medium according to claim 6, wherein said membrane material is placed between two fabric structure means.

9. The filter medium according to claim 8, wherein the membrane material is applied to a compact, strong support fabric layer, and a protective fabric layer is inserted in the upper region of the membrane material.

10. The filter medium according to claim 9, wherein the protective fabric layer is constructed as an open-mesh fabric.

11. A filter medium for cake-forming filtration processes, the filter medium comprising:
   (a) a filter membrane having surfaces;
   (b) at least one fabric structure completely penetrating the filter membrane from one surface to another surface, the at least one fabric structure including:
      (1) a support structure for supporting the filter membrane; and (2) a protective structure protruding from the filter membrane for protecting the filter membrane.

12. The filter medium of claim 11, wherein the fabric structure is arranged in three dimensions, and completely penetrates the filter membrane.

13. The filter medium of claim 11, wherein the fabric structure has top fabric threads which project over at least one surface of the filter medium to form the protective structure.

14. The filter medium of claim 11, wherein the fabric structure has top threads projecting over opposite surface of the filter membrane to form a protective structure on both surfaces.

15. The filter medium of claim 11, wherein:
the fabric structure is an open-mesh fabric structure allowing a substantial fraction of the filter membrane to contact a material to be filtered while the fabric structure still protects the filter membrane.

* * * * *